(12) United States Patent
Fahey

(10) Patent No.: US 6,301,081 B1
(45) Date of Patent: Oct. 9, 2001

(54) ACTUATOR AND HEAD LIFTING TAB FOR A DISK DRIVE

(75) Inventor: James D. Fahey, Farmington, CA (US)

(73) Assignee: Iomega Corporation, Roy, UT (US)

( * ) Notice: Subject to any disclaimer, the term of this patent is extended or adjusted under 35 U.S.C. 154(b) by 0 days.

(21) Appl. No.: 09/346,486

(22) Filed: Jul. 1, 1999

(51) Int. Cl.[7] ...................................................... G11B 5/54
(52) U.S. Cl. .............................................................. 360/255
(58) Field of Search ................................ 360/254.2, 256

(56) References Cited

U.S. PATENT DOCUMENTS

| | | | |
|---|---|---|---|
| 4,663,682 | * 5/1987 | McNeil | 360/105 |
| 5,208,712 | * 5/1993 | Hatch | 360/105 |
| 5,237,472 | * 8/1993 | Morehouse | 360/105 |
| 5,585,980 | * 12/1996 | Boutaghou | 360/105 |
| 5,995,330 | * 11/1999 | Furay | 360/105 |

* cited by examiner

Primary Examiner—A. J. Heinz
(74) Attorney, Agent, or Firm—Woodcock Washburn Kurtz Mackiewicz & Norris LLP

(57) ABSTRACT

An improved disk drive actuator for moving read/write heads to interface with a storage medium of a disk cartridge has an improved head lifting tab. The head lifting tab has first and second curved portions. The first portion may be curved about the longitudinal axis of the lifting tab. The second portion is curved about a line that is in angular relationship with the longitudinal axis, and about the longitudinal axis. The curved first portion increases the stiffness of the actuator, and the curved second portion defines a camming surface for slidably engaging the load ramp and lifting the heads away from a disk cartridge.

15 Claims, 6 Drawing Sheets

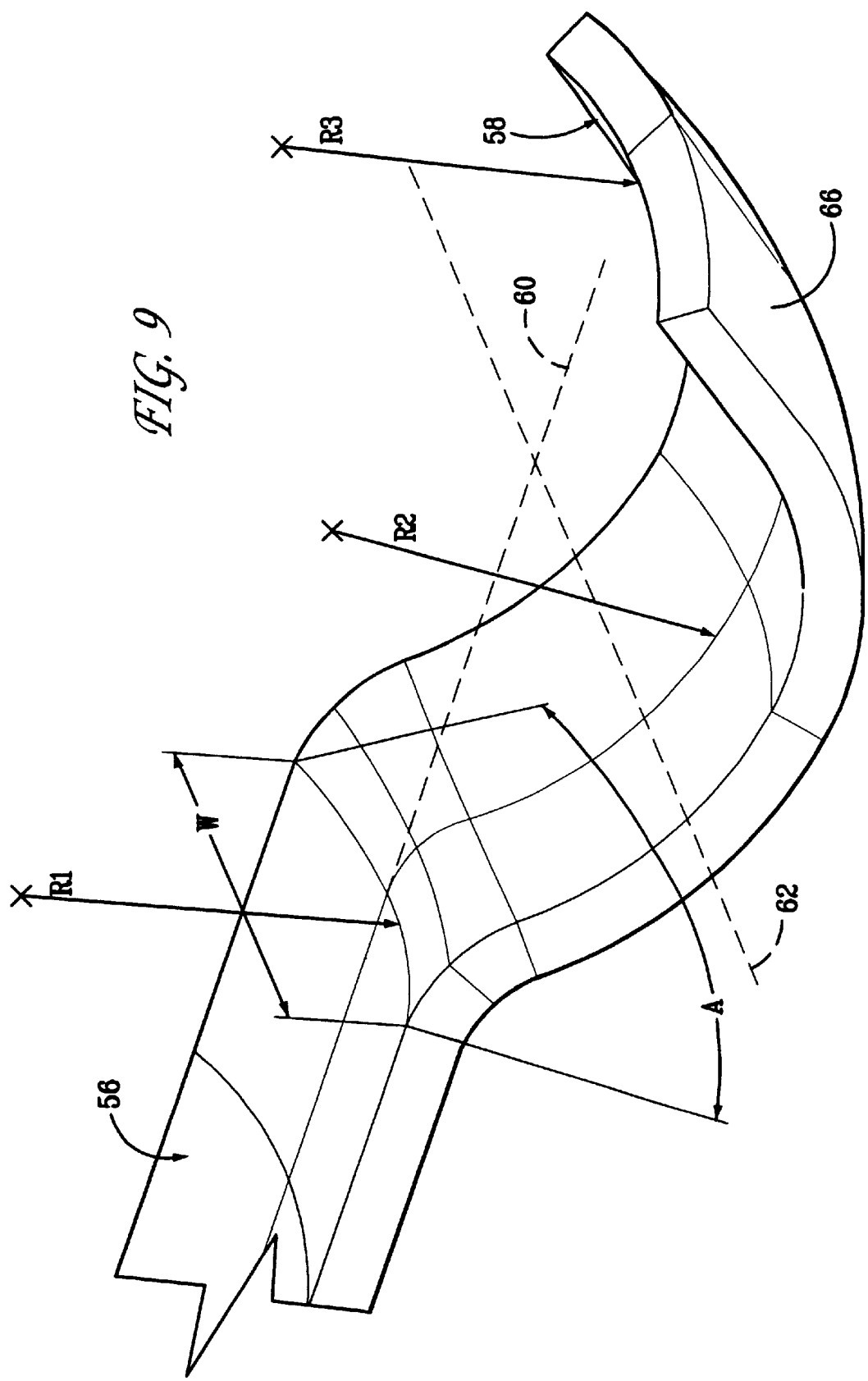

ACTUATOR AND HEAD LIFTING TAB FOR A DISK DRIVE

BACKGROUND OF THE INVENTION

This invention relates to actuators for disk drives that have read/write heads for communicating with a disk cartridge and to head lifting tabs for lifting the heads away from a disk cartridge.

Conventionally, a removable cartridge disk drive has an actuator upon which read/write heads are mounted for communicating with a disk cartridge. Although they may be attached to the actuator in a variety of manners, the read/write heads or "heads" are typically attached to an area of the actuator that is disposed near an end of the actuator. In order to prevent or minimize the likelihood of damage to the read/write heads, they are typically placed in a retracted position within a disk drive until a disk cartridge is inserted into the disk drive. Upon insertion of a disk cartridge, the actuator may be rotated to a loaded position, so that the read/write heads can interface with the disk cartridge, and in particular the storage medium of the disk cartridge. When the inserted disk cartridge is to be ejected from a disk drive, the actuator and the read/write heads are rotated away from the disk cartridge and to the retracted position.

By way of background, actuators are typically of one of two types, either linear or rotary. However, others may be employed. Linear actuators move along a single axis and typically move forward in the disk drive so that the heads can interface with the disk cartridge, and towards the rear of the disk drive to remove the heads from the disk cartridge and into the retracted position. Rotary actuators operate in a similar fashion, but they rotate about an axis, as opposed to moving along a single axis, to engage and disengage the heads respectively with and from a disk cartridge.

Generally, a rotary actuator is attached at one of its longitudinal ends to the disk drive and is not attached to the disk drive at its other longitudinal end. The heads are attached proximal to the unattached longitudinal end of the rotary actuator. In order to support the heads and protect them from damage when a removable disk cartridge is not loaded into the disk drive and when the actuator is not interfacing with the disk cartridge, a load ramp is typically provided in disk drives that employ rotary actuators to support the unattached longitudinal end of the rotary actuator. By supporting the unattached longitudinal end of the actuator, the load ramp holds the actuator in a retracted position and thereby prevents or minimizes the likelihood of damage to the heads.

When the rotary actuator moves the heads to interface with the storage medium of the disk cartridge, the unattached longitudinal end of the actuator moves off of the load ramp and proximal to the storage medium of the disk drive. In this position, the heads can communicate with the storage medium of the disk cartridge. This position of the actuator may be referred to as the loaded position.

In order to support the actuator when it rests on the load ramp, the actuator may have a head lifting tab. The head lifting tab is the part of the actuator that directly interfaces with the load ramp. That is, the head lifting tab slidably engages the load ramp and rests on the load ramp to support the actuator when the heads of the actuator are not interfacing with the storage medium. When the actuator moves so that the heads can interface with the storage medium, the head lifting tab slides along the load ramp until it reaches the end of the load ramp. Upon reaching the end of the load ramp, the lifting tab slides off of the load ramp and the heads of the actuator engage the storage medium. Similarly, when the actuator is moved from the loaded position in which the heads interface with the storage medium, the lifting tab slidably engages the end of the load ramp and slides onto the load ramp and thereby lifts the heads away from the disk cartridge.

The stiffness of the head lifting tab can be significant because as the stiffness of the head lifting tab increases the deflection of the lifting tab is reduced. By reducing the deflection of the head lifting tab, the likelihood of the heads contacting a piece of the disk drive being damaging is reduced. A stiffer head lifting tab also helps increase resonance frequencies in the suspension, thus improving the speed at which the head can be moved on the media to retrieve and write data.

Many prior art head lifting tabs have edges or straight surfaces that engage the load ramp. These edges have the potential disadvantage of gauging or wearing the load ramp after numerous head loading and unloading operations.

The lifting tab configuration must be lightweight to minimize the mass extending from the suspension, yet have sufficient strength such that deflection of the suspension is within a predetermined amount to prevent damage to the lifting tab, heads, or other components.

An aspect of advancing technology has been problematic for disk drive load ramp design and manufacture. As disk drive technology has developed towards lower costs, the size of the slider has been reduced in order to manufacture more sliders per wafer. Therefore smaller sliders reduce costs and the length, width, and thickness of the slider.

Thinner sliders cause a diminished gap (compared with thicker heads) between the suspension arm and the disk surface, which is problematic for the load ramp design and manufacturing. In configurations in which the load ramp extends over top the disk surface, the diminished gap requires load ramps having even thinner ends. This is especially problematic for removable cartridge drives because the disk must be accurately positioned numerous times, and interchangeable cartridges might not have uniform dimensions because of manufacturing tolerances. Producing load ramps that have uniform, knife-like edges by conventional plastic manufacturing is difficult.

Further, the plastic load ramp may wear after repeated loading and unloading cycles. Such wear may cause damage to the disk if the head is not sufficiently lifted. Further, the wear exacerbates the difficulties related to ramp edge thinness.

This invention relates to improved actuators that have improved head lifting tabs for engaging load ramps. This invention also relates to improved disk drives and methods of operating improved disk drives that employ improved actuators that have the improved head lifting tabs.

SUMMARY OF THE INVENTION

An actuator for communicating with a disk cartridge may include an actuator arm for rotatably mounting the actuator to a disk drive. The actuator may be disposed in a disk drive that can receive a disk cartridge that has a storage medium. Disposed on the actuator may be a head gimbal assembly having read/write heads for interfacing with the storage medium. The actuator may also have a suspension arm mounted to the actuator arm and extending from the actuator arm. The suspension arm may have a longitudinal axis and a head lifting tab disposed in an angular relationship with the longitudinal axis of the suspension arm. One purpose of the head lifting tab is to lift the actuator away from a disk cartridge that has been inserted into the disk drive to which the actuator is installed.

When disposed in a disk drive, the actuator can move between a retracted position and a loaded position. In the retracted position, the head lifting tab rests on a load ramp disposed in the disk drive and supports the suspension arm and the read/write heads. In the loaded position, the head lifting tab is disengaged from the load ramp so that the read/write heads can interface with a storage medium of a disk cartridge.

The head lifting tab may include a first portion, disposed proximal to the suspension arm, and a second portion extending from the first portion. The second portion may define an end of the head lifting tab. Both the first and the second portions may be curved. The first portion is preferably curved about a longitudinal axis of the head lifting tab, and the second portion may be curved about a line that is perpendicular to the longitudinal axis of the head lifting tab. In addition, the second portion may also be curved about the longitudinal axis of the head lifting tab. The first curved portion preferably increases the effective stiffness of the suspension. The second curved portion preferably stiffens the suspension and defines a camming (or rounded) surface for slidably engaging the load ramp of the disk drive. In a preferred embodiment, the first and the second curved portions are integrally formed with the suspension arm.

In the retracted position, the second curved portion of the head lifting tab rests on the load ramp of the disk drive and supports the actuator. When the actuator is moved to a loaded position to interface with a storage medium of a disk cartridge, the second curved portion slides along the load ramp until it reaches an end of the load ramp. At the end of the load ramp, the head lifting tab slides off of the load ramp and moves to the loaded position where the heads of the actuator interface with the storage medium of the disk cartridge. In order to move back to the retracted position, the actuator is moved so that the second curved portion of the head liffing tab slidably engages the load ramp. As the head lifting tab slidably engages the load ramp, the head lifting tab acts as a cam and lifts the read/write heads away from the storage medium of the disk cartridge. The head lifting tab can then slide along the load ramp to move the actuator and the read/write heads to the retracted position.

Preferably, the improved actuator of this invention can be rotatably mounted to a disk drive. A voice coil motor or similar device can be used to rotate the actuator, and thereby slide the head lifting tab along the load ramp.

The disk drive into which the improved actuator of this invention may be disposed may have a sensor and an eject system. The sensor preferably detects when a disk cartridge is inserted into the disk drive, and the eject system ejects the disk cartridge from the disk drive. Further, the disk drive into which the improved actuator of this invention may be disposed may be in electrical communication with a microprocessor and a computer programmable memory. In particular, the sensor, the eject system and the voice coil motor for powering the actuator may be in electrical communication with the microprocessor and the computer programmable memory. In operation, the sensor detects when a disk cartridge had been inserted into the disk drive and communicates this to the microprocessor. After noting the presence of a disk cartridge in the disk drive, the microprocessor communicates with the computer programmable memory, which controls the microprocessor, to power the voice coil motor. When powered, the voice coil motor rotates the actuator and the attached head lifting tab. The head lifting tab then slides along the load ramp to move the actuator and the read/write heads from the retracted position to the loaded position, as described above.

In order to eject the disk cartridge from the disk drive, the eject system may be activated. This activation may include depressing an eject button disposed on the disk drive. Upon activating the eject system, the eject system sends an electrical signal to the microprocessor informing the microprocessor and the computer programmable memory that it has been activated. The computer programmable memory then controls the microprocessor to power the voice coil motor. As the voice coil motor is powered, the actuator and the head lifting tab are moved from the loaded position to the retracted position, as described above.

Other features of the invention are described below.

BRIEF DESCRIPTION OF THE DRAWINGS

FIG. 9 is an enlarged view of a portion of the preferred embodiment shown in FIG. 6.

DETAILED DESCRIPTION OF THE EMBODIMENTS

Figure 1:
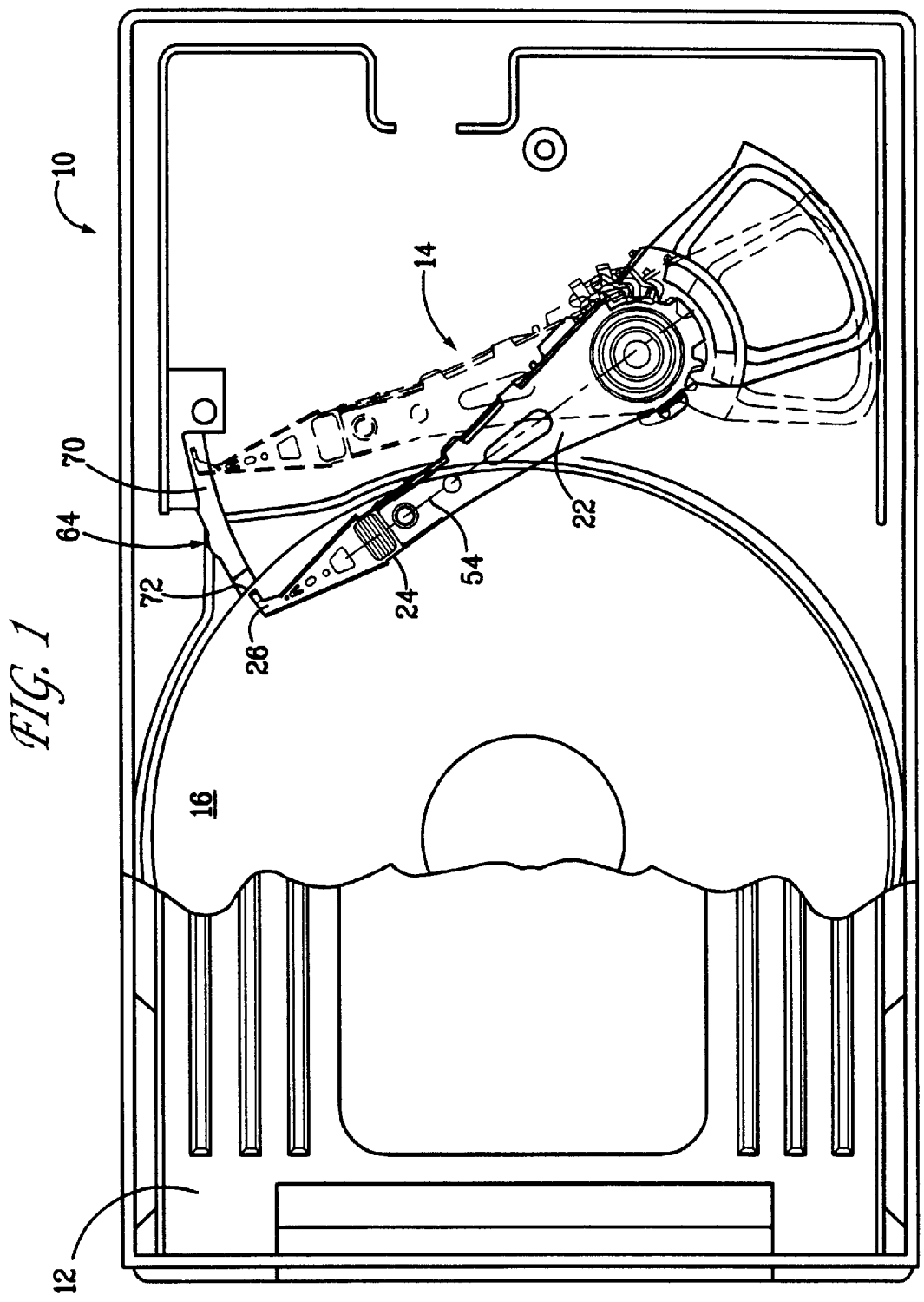
FIG. 1 is an top view of a preferred embodiment of this invention.

By way of background, disk drives 10 that interface with disk cartridges 12 typically have an actuator 14 for interfacing with a disk cartridge 12. A typical disk cartridge 12 has a storage medium 16 for storing information. One such storage medium 16 of a disk cartridge 12 is depicted in FIG. 1. The actuator 14 of this invention may be employed in a variety of disk drives 10, one of which is shown in FIG. 1. The disk drive 10 may have a platform (not shown) upon which the actuator 14 is disposed. The platform may be metallic, plastic, a combination of plastic and metal or any suitable material. Disk drive 10 and cartridge 12 may be substantially as described in co-pending U.S. patent application Ser. No. 08/835,437, filed Apr. 9, 1997, entitled, "Shutterless Data Recording Cartridge and Drive for Using Same," which is assigned to the present assignee and incorporated herein in its entirety.

Figure 7:
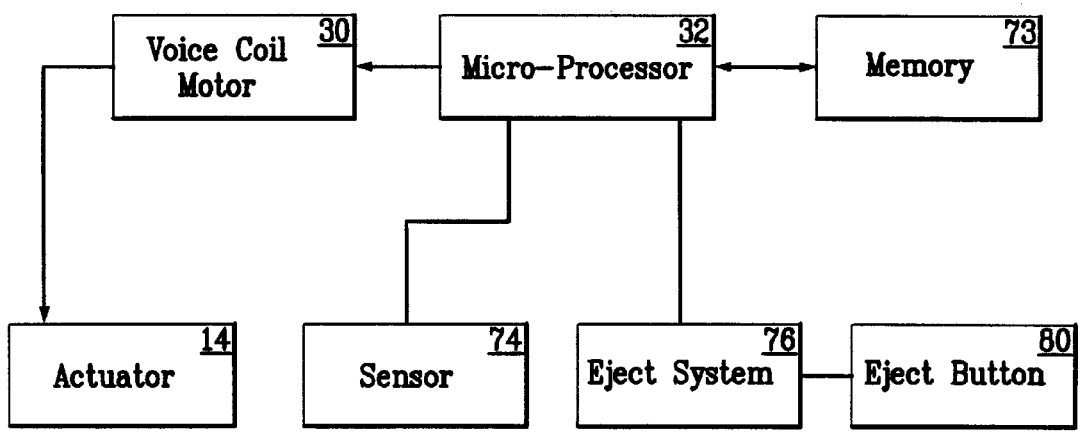
FIG. 7 is a schematic diagram of a preferred embodiment of the system of this invention.
Figure 8:
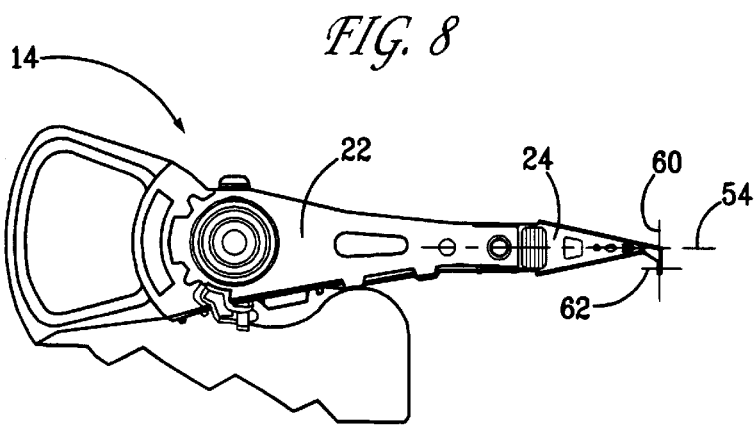
FIG. 8 is a plan view of the preferred embodiment of FIG. 1.
Figure 8A:
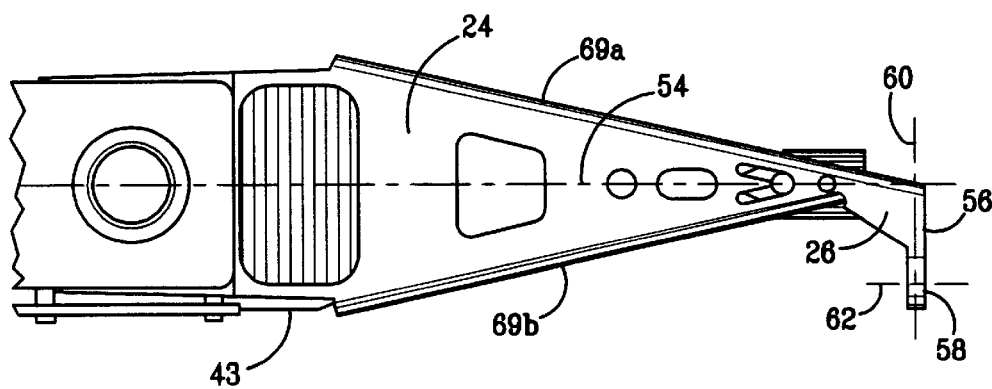
FIG. 8A is a plan view of a portion of the preferred embodiment of FIG. 1.

The actuator 14 of this invention may be a rotary type actuator that is rotatably mounted to the disk drive 10, as shown in FIG. 1. In addition, the actuator 14 of this invention may have a pair of actuator arms 22, a pair of suspension arms 24, a pair of head lifting tabs 26 and a head gimbal assembly 28. Aspects of this actuator 14 are also shown in FIGS. 8 and 8A. A voice coil motor 30, as shown schematically in FIG. 7, may be mounted to the disk drive 10 to control the movement of the actuator 14. Preferably, the voice coil motor 30 interfaces with a microprocessor 32 to control the movement of the actuator 14. As described in more detail below, the microprocessor 32 and the voice coil motor 30 move the actuator 14 in between at least two different positions, a loaded position and a retracted position. In the loaded position, the actuator 14 can interface with the storage medium 16 of the disk drive 10. Conversely, in the retracted position, the actuator 14 does not interface with the storage medium 16 of the disk drive 10 and is retracted so that the likelihood of damage to the head gimbal assembly 28 of the actuator 14 is minimized.

Figure 2:
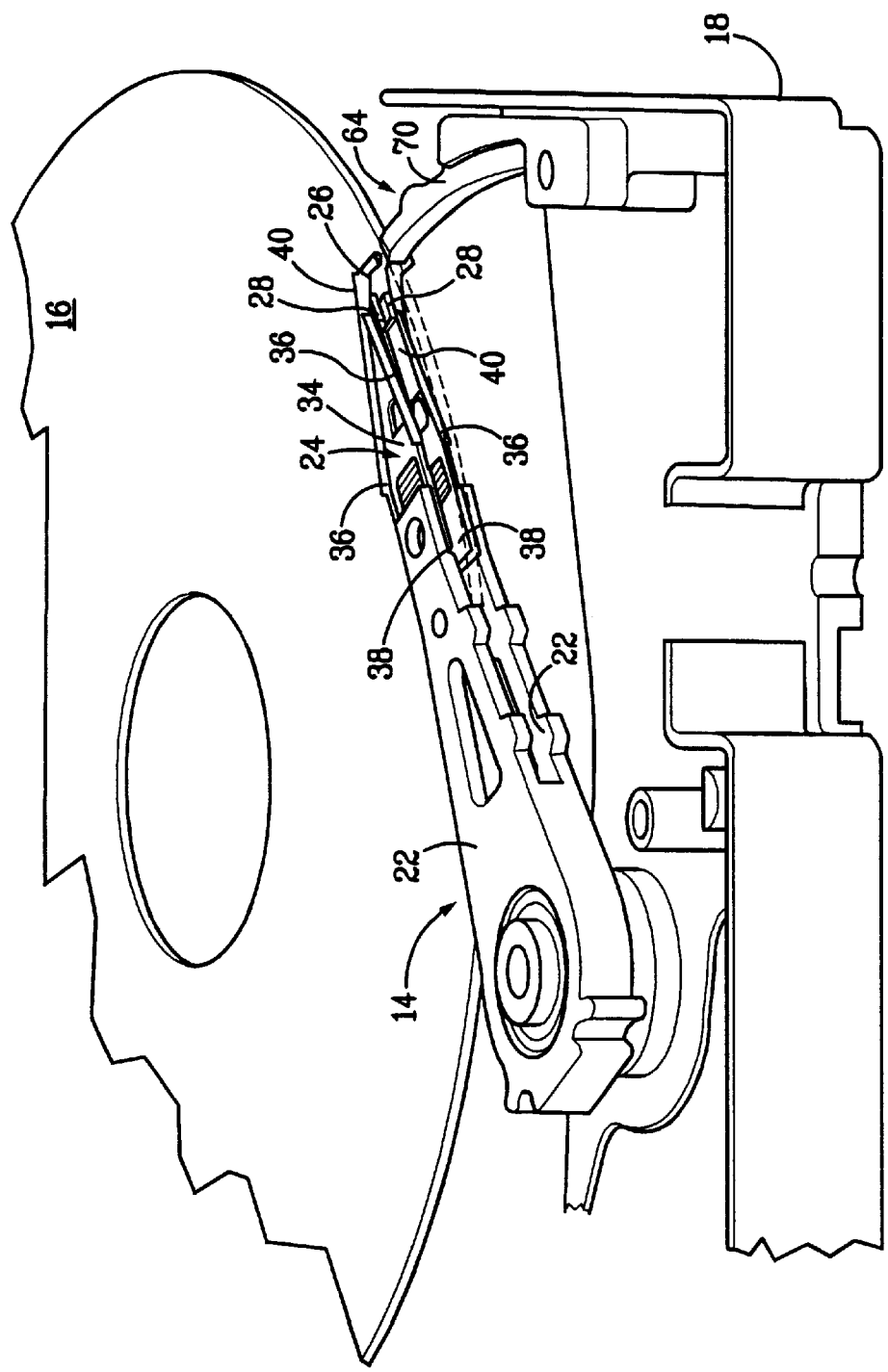
FIG. 2 is an isometric view of a portion of the preferred embodiment of the invention depicted in FIG. 1.
Figure 6:
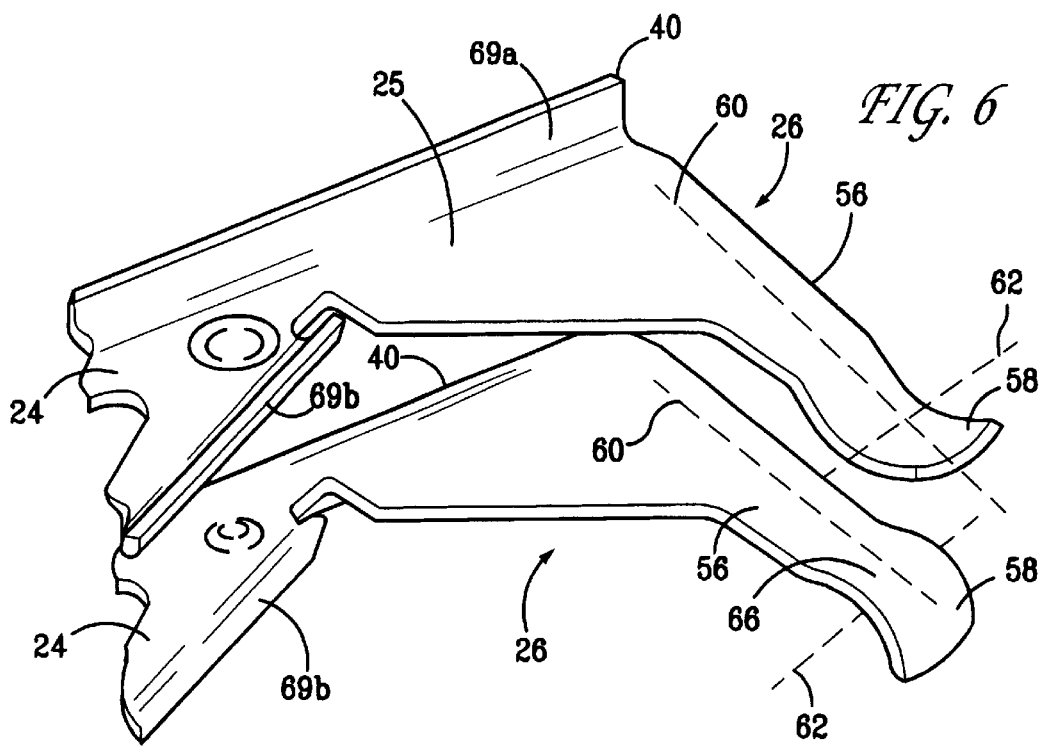
FIG. 6 is an isometric view of a portion of the preferred embodiment shown in FIG. 1.

The actuator arms 22 are preferably rotatably mounted to the disk drive 10 and preferably are manufactured from aluminum. The actuator arms 22 may be integrally formed with each other, as shown in FIG. 2. One of the functions of the actuator arms 22 is to provide structural support for the suspension arms 24. One of the suspension arms 24 extends from each actuator arm 22. The suspension arms 24 preferably comprises a manufacturable metal and even more preferably stainless steel. In a preferred embodiment, the suspension arms 24 are relatively thin. Preferably, the suspension arm 24, that is attached to the top actuator arm, has a portion 34 that has sides 36 extending from a top surface of the suspension arm 24. Similarly, the suspension arm that is attached to the bottom actuator arm 22 has a portion that has sides 36 extending from a bottom surface (not shown). These sides 36 define a groove for attaching a wire 43, as shown in FIG. 8a, that electrically connects the heads 42 to the microprocessor. The suspension arms 24 may be ball swayed to the respective actuator arms 22 or attached by other known fastening techniques. One of the functions of the suspension arms 24 is to connect the actuator arm 22 to the head gimbal assemblies 28, which are preferably disposed on each of the suspension arms 24. The head gimbal assemblies 28 may be attached to the suspension arms 24 so that they can float on the suspension arms 24. In a preferred embodiment of this invention, the actuator arms 22 are attached to a first end 38 of the suspension arms, and the head gimbal assemblies 28 are each attached to a second end 40 of the suspension arms. The second end 40 of the suspension arms 24 preferably oppose the first end 38 of the suspension arms 24, and the first 38 and the second ends 40 are most preferably disposed at either longitudinal end of the suspension arms 24. As best shown in FIG. 6, an extension 25 preferably extends from the outboard side of suspension arm 24 at end 40.

Figure 3:
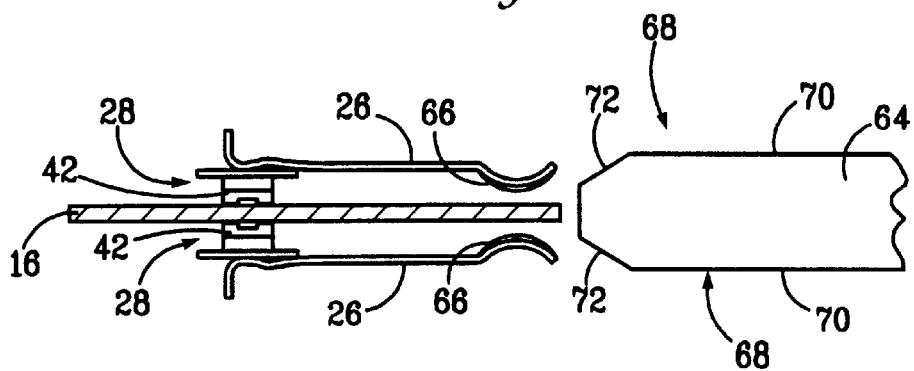
FIG. 3 is a side view of a portion of the preferred embodiment depicted in FIG. 1 in a loaded position.
Figure 4:
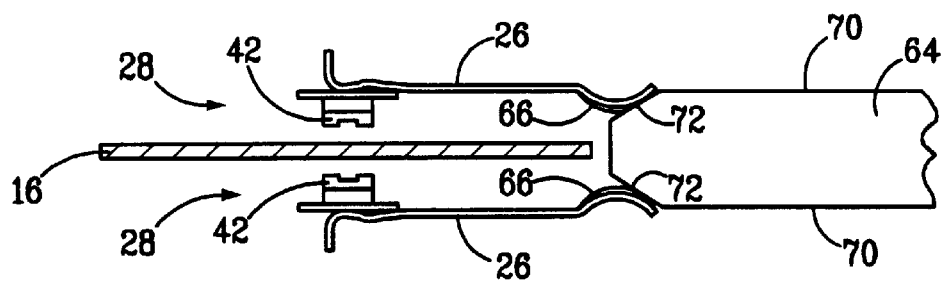
FIG. 4 is another side view of the portion of the preferred embodiment depicted in FIG. 3.
Figure 5:
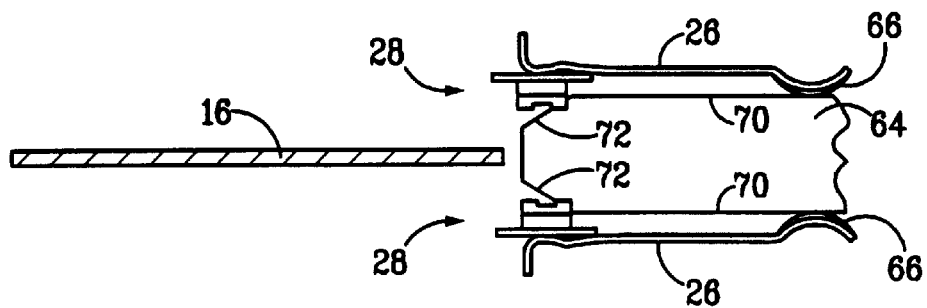
FIG. 5 is another side view of the portion of the preferred embodiment depicted in FIG. 3 in an unloaded position.

Each of the head gimbal assemblies 28 preferably includes a pair of sliders or read/write heads 42 that have magnetic read/write elements, as is best shown in FIG. 4, for interfacing with the storage medium 16 of the disk cartridge 12, as is best shown in FIGS. 3–5. A wire 43, as shown in FIG. 8a, for electrically connecting the magnetic read/write heads of the head gimbal assembly to the microprocessor 32 may be attached to the suspension arms 24 and the actuator arms 22.

Disposed on each of the suspension arms 24, as is best shown in FIGS. 2, 8 and 8A, is the head lifting tab 26 of this invention. In a preferred embodiment, the head lifting tab 26 is formed integrally with each of the suspension arms 24. The head lifting tabs 26 may extend from an end of each of the suspension arms 24. Preferably, the head lifting tabs 26 extend from the second end 40 of the respective suspension arm 24. The head lifting tabs 26 may extend in an angular relationship with the respective suspension arm 24. In a preferred embodiment the head lifting tabs 26 extend from the respective suspension arm 24 in an angular relationship with the longitudinal axis 54 of the suspension arm 24, which is also the longitudinal axis of the actuator 14. In the embodiment shown, the head lifting tabs 26 extends perpendicular with the longitudinal axis 54 of the suspension arm 24. However, the head lifting tabs 26 may be disposed at other angles with the longitudinal axis 54 of the suspension arm 24.

As shown in FIGS. 6 and 9, each of the head lifting tabs 26 may have a first portion 56 and a second portion 58. The first portions 56 extend from the second end 40 of the respective suspension arm 24, and the second portions 58 extend from the respective first portions 56. Each of the first portions 56 may generally have a curved shape. The first portions 56 may have a curved shape that is concave (as shown in FIG. 9). The present invention also encompasses first portions 56 that are substantially flat (not shown in FIG. 9). The first portions 56 may be curved about a first axis 60 of the head lifting tab 26. In an embodiment, first portion 56 may be curved at a radius R1 of about 0.7 mm.

According to an aspect of the present invention, the second portion 58 of each of the head lifting tabs 26 may also be curved, and is preferably concave. The second portions 58 of the head lifting tabs 26 are curved to form a cammed surface 66 for interfacing with a load ramp 64 disposed in the disk drive 10. As shown and described in further detail below, the cammed surfaces 66 can slidably engage the load ramp 64.

Preferably, the second portion 58 of each of the head lifting tabs 26 is curved both about first axis 60 and about a transverse axis 62 that is perpendicular to the first axis 60 of the head lifting tabs 26. In a preferred embodiment shown in FIG. 9, which shows second portion 58 curved about axis 60 and axis 62, the curve of the second portions 58 may be curved at a radius R2 (that is, about an axis parallel to transverse axis 62) of about 0.54 mm. A curvature R3 (that is, about an axis parallel to first axis 60) of second portions 58 preferably is approximately 0.7 mm, which is consistent with the corresponding curvature R1. First portion 56 may have a cord width W of approximately 0.54 mm. Because R1 preferably is approximately equal to R3, cord width W is approximately uniform between first portion 56 and second portion 58. Cord angle A is approximately 44 degrees.

To form second portion 58, outside edges of second portion 58 may be etched to reduce thickness relative to the other parts thereof. During the forming process (that is, forming or stamping about axis 62), second portion 58 also curves about axis 60. Further, a coining process may be employed to obtain a smooth finish, especially for cammed surface 66.

The first 56 and second portion 58 of each of the head lifting tabs 26 increase the effective stiffness of the respective lifting tab 26 because they are curved and thereby add mass and increase the moment of inertia of the head lifting tab 26. This is important for several reasons. As the stiffness of the head lifting tab increases, the deflection of the head lifting tab 26 when the lifting tab 26 is being moving off of the load ramp 64 and onto the storage medium is decreased. Thus, the deflection of the head lifting tab 26 is diminished when moving off of the storage medium and onto the load ramp 64. Decreasing the deflection of the head lifting tab 26 is significant because it limits the amount of bending of the tab 26 during loading and unloading. This reduces the likelihood of the heads contacting a surface of the disk drive during loading and unloading and being damaged.

Furthermore, a stiffer head loading tab 26 ensures that the heads will lift off of the storage medium quickly against the vacuum that is created by the negative pressure area of the slider and the rotating storage medium. The vacuum tends to pull the heads towards the storage medium and must be overcome by the head lifting tab to unload the heads. The stiffer head lifting tab is more responsive to unload the heads and prevent the heads from being dragged on the medium and being damaged or damaging the storage medium.

Because the head lifting tab 26 is curved, only the camming surface 66 contacts the load ramp 64. This is in contrast to previous designs in which an edge of a head lifting tab contacts the load ramp. Because the camming surface 66 is smoother than an edge, the camming surface 66 reduces the likelihood of wear on the load ramp, as the camming surface 66 rides on the load ramp 64 during the loading and unloading operations. Reducing the wear on the ramp 64 has the potential to increase the life of the load ramp 64, and may prevent media damage.

Having a head lifting tab 26 that is curved about the axis 62 to define a camming surface 66 also reduces the tolerance sensitivity that is needed to ensure that the head lifting tab 26 engages the load ramp during the head unloading sequence relative to head lifting tabs that have edges for engaging the load ramp. This occurs because the camming surface 66 is more likely to ride up the loading ramp 64 if the surface is not as precisely manufactured, as an edge surface. The reduction in tolerance sensitivity has the potential to translate into a reduction in manufacturing costs.

The head lifting tabs 26 of this invention may interact with a variety of load ramps. One type of load ramp 64 that the head lifting tab 26 may interact with is shown in FIGS. 1 and 2. As shown, the load ramp 64 may have a guiding surface 68 on its top and its bottom. Each of the guiding surfaces 68 may have a first region 70 and a second region 72. The first regions 70 may be relatively flat and disposed parallel to the disk drive platform (that is, substantially horizontal). In comparison, the second regions 72 may be disposed in an angular relationship with the respective first regions 70. The first regions 70 are for supporting the respective head lifting tabs 26 and the actuator 14 when the actuator 14 is not interfacing with a disk cartridge 12. This position may be referred to as the retracted position. In this retracted position, the read/write heads 42 are supported by the head lifting tabs 26 and the load ramp 64 and are disposed toward the rear of the disk drive 10. Thus, in the retracted position the read/write heads 42 are in a position which reduces the likelihood of damage to the read/write heads 42.

The second region 72 provides a ramp 64 for the head lifting tabs 26 to slide upon as they either move from their retracted position to the loaded position in which the attached read/write heads 42 interface with a storage medium 16 of a disk cartridge 12 or from the loaded position to the retracted position. This is best understood with reference to FIGS. 1 and 3–5. FIG. 1 in phantom and FIG. 5 depict the camming surfaces 66 of the head lifting tabs 26 resting on the load ramp 64 in the retracted position. In order to move from the retracted position, the actuator 14 rotates in a counter clockwise direction as shown in FIG. 1. As the actuator 14 rotates, the camming surfaces 66 of the head lifting tabs 26 slides along the first regions 70 until the head lifting tabs 26 reach the second regions 72 of the load ramp 64. Upon reaching the second regions 72 of the load ramp 64, the camming surfaces 66 of the head lifting tabs 26 slide down and up respectively on the load ramp 66 as is best shown in FIG. 4. After sliding down and up the second regions 72 of the load ramp 64, the head lifting tabs 26 slides off of the load ramp 64 and the read/write heads 42 of the actuator 14 are in the loaded position, as shown in FIGS. 1 and 3 and can interface with the storage medium 16 of the disk cartridge 12.

In order to move the actuator 14 and the read/write heads 42 from the loaded position to the retracted position, the actuator 14 rotates in the clockwise direction as shown in FIG. 1. As the actuator 14 rotates, the camming surfaces 66 comes into proximity with the second regions 72 of the load ramp 64 and engage the load ramp 64, as shown in FIG. 4. As the camming surfaces 66 slidably engage the load ramp 64, the actuator 14 is displaced in a direction that is approximately perpendicular to the chassis 18 of the disk drive 10 and the head lifting tabs 26 thereby lifts the read/write heads 42 off of the storage medium 16 of the disk cartridge 12. In order to move to the retracted position, the actuator 14 continues to rotate in the clockwise direction, as shown in FIG. 1, and the camming surfaces 66 slides up and down the second regions 72 of the load ramp 64. The camming surfaces 66 reach the first regions 70 of the load ramp 64 and then slide along the first regions 70 until the retracted position is reached, as shown in FIG. 5. In the retracted position, the actuator 14 stops rotating, and the actuator 14 rests with the read/write heads 42 supported by the head lifting tabs 26 and the load ramp 64.

The head lifting tabs 26 are preferably spring biased by the suspension arms 24 toward each other, as is best shown by comparing FIGS. 3 and 4. In the loaded position in which the head lifting tabs 26 are not resting on the load ramp 64, the read/write heads have moved proximal to each other with the storage medium disposed between them. By way of contrast, in FIG. 4 the head lifting tabs 26 have engaged the load ramp 64. In this engaged position, the head lifting tabs 26 have moved away from each other and thereby moved the read/write heads 42 away from each other. In the retracted position as shown in FIG. 5, the head lifting tabs 26 have been moved even further from each other as have the read/write heads 42.

In order to move the head lifting tabs 26 between the retracted position and the loaded position, the actuator 14 may have, as referred to above, a voice coil motor 30. This voice coil 30 motor may be in electrical communication with a microprocessor 32 and a computer programmable memory 73 that has programmed code for controlling the operation of the microprocessor 32, as depicted schematically in FIG. 7. The disk drive 10 may also have a sensor 74 that may be either mechanical or electrical in nature for sensing when a disk cartridge 12 is inserted into the disk drive 10 and an eject system 76 for ejecting a disk cartridge 12 from the disk drive 10. The sensor 74 and the eject system 76 may be in electrical communication with the microprocessor 32. Neither the sensor 74 nor the eject system 76 is a novel feature of this invention, but they may be employed with the actuator 14 of this invention.

When a disk cartridge 12 is inserted into the disk drive 10, the sensor 74 will detect its presence and electrically communicate this to the microprocessor 32. The memory 73 will then control the microprocessor 32 to power the voice coil motor 30 of the actuator 14. When powered, the voice coil motor 30 will rotate the actuator 14 and the actuator 14 will move from the retracted position to the loaded position, as described above.

In order to eject a disk cartridge 12 from the disk drive 10, the eject system 76 is activated and a signal is sent to the microprocessor 32. Activation of the eject system 76 may include depressing an eject button 78 disposed on the disk drive 10. The microprocessor 32 then communicates with the memory 73, which controls the microprocessor 32 to power the voice coil motor 30 and move the actuator 14 from the loaded position to the retracted position.

In summary, the actuator 14 of this invention may have an improved head lifting tab 26. The improved head lifting tab 26 preferably extends from an end of the actuator 14 and in an angular relationship with the first axis of the actuator 14. The head lifting tab 26 may have a first 56 and a second 58 portion both of which are curved. The second portion 58 is preferably curved to form a camming surface 66 for slidably engaging a load ramp 64 of a disk drive 14. The camming surface 66 slides along the load ramp 64 to move the actuator between a retracted position and a loaded position. In order to move from the loaded position, the camming surface 66 slidably engages the load ramp 64 to lift the read/write heads 42 of the actuator 14 off of the disk cartridge 12 and onto the load ramp 64. The camming surface 66 then slides along the load ramp 64 as the actuator 14 moves to its retracted position. The present invention encompasses a lifting tab that is substantially flat—that is, a first portion (not shown) that is not curved around axis 60

According to another aspect of the present invention, stiffener 69a and 69b are formed along the length of the suspension arm 24. The stiffener 69a extends beyond the major portion of arm 24 so as to stiffen an extension 25 of arm 24, as best shown in FIG. 6. Preferably, stiffener 69a is integrally formed with suspensions 24 and extension 25 by stamping and coining metal to form substantially mutually perpendicular members. Stiffeners 69a and 69b stiffen suspension arm 24, and stiffener 69a is especially beneficial because it resists and diminishes angular deflection of the lifting tab by stiffening extension 25.

The head lifting tab 26 of this invention has several advantages including an increased stiffness, which minimizes the deflection of the head lifting tab 26 and the likelihood of damaging the heads during head loading and unloading. Further, because the head lifting tab 26 has a camming surface 66, the likelihood of wear on the ramp is decreased and the tolerance sensitivity of the tab 26 is decreased.

Some prior art lifting tabs extend along a centerline of the suspension arm. However, with disks longer than a 2.5 inch form factor, a lifting tab that forms an angular relationship with the arm centerline saves space, as shown in FIG. 6 according to the present invention. Specifically, tabs that extend along the suspension centerline must be long enough to extend to the end of load ramp (whether over top of the disk or outside the disk perimeter) before the head reaches the disk into perimeter (during unloading). As the disk form factor gets larger, especially greater than 2.5 inches, the overall length of the suspension arm (including the extension) becomes difficult to fit into a standard width drive bay. The present invention is preferably employed with a disk having a 3.5 inch form factor, so the configurations of lifting tabs 26 conserve space.

It is to be understood, however, that even in numerous characteristics and advantages of the present invention have been set forth in the foregoing description, together with details of the structure and function of the invention, the disclosure is illustrative only, and changes may be made to detail, especially in matters of shape, size and arrangement of parts within the principles of the invention to the full extent indicated by the broad general meaning of the terms in which the appended claims are expressed.

What is claimed is:

1. A disk drive of the type that can receive a disk cartridge, comprising:
    a load ramp mounted to the disk drive;
    an actuator, rotatably mounted to the disk drive, comprising an actuator arm, a suspension arm extending form the actuator arm and a first head lifting tab, the first head lifting tab being disposed in an angular relationship with a longitudinal axis of the suspension arm and being for lifting the actuator from the disk cartridge by slidably engaging the load ramp, the first head lifting tab comprising
        (i) a first portion, disposed proximal to the suspension arm, for increasing the stiffness of the first head lifting tab; and
        (ii) a curved second portion, extending from the first position and defining a camming surface, for slidably engaging the load ramp and increasing the stiffness of the head lifting tab;
    wherein the first portion of the first head lifting tab is curved about a longitudinal axis of the first head lifting tab and the curved second portion of the first head lifting tab is curved about a line that is perpendicular to the longitudinal axis of the first head lifting tab and about the longitudinal axis of the first head lifting tab to define the camming surface for engaging the load ramp.

2. A head lifting tab for attaching to a suspension arm of an actuator disposed in a disk drive and for slidably engaging a load ramp disposed in the disk drive and thereby lifting the suspension arm relative to a disk cartridge disposed in the disk drive, comprising:
    a tab longitudinal axis that is disposed in an angular relationship with a suspension arm longitudinal axis;
    a first portion attached to the actuator that is curved for increasing the stiffness of the head lifting tab; and
    a curved second portion, curved about the tab longitudinal axis and a line that is perpendicular to the tab longitudinal axis to define a camming surface, for slidably engaging the load ramp and increasing the stiffness of the head lifting tab, the curved second portion extending from the first portion.

3. An actuator for mounting in a disk drive and for communicating with a disk cartridge, comprising:
    a first actuator arm for rotatably mounting the actuator to the disk drive;
    a first suspension arm mounted to the first actuator arm and extending from the first actuator arm, the first suspension arm having a longitudinal axis;
    a first head lifting tab, disposed in an angular relationship with the longitudinal axis of the first suspension arm, for lifting the actuator from the disk cartridge by slidably engaging a load ramp disposed in the disk drive, comprising
        (i) a first portion, disposed proximal to the first suspension arm, for increasing the stiffness of the head lifting tab; and
        (ii) a curved second portion, extending from the first position and defining a camming surface, for slidably engaging the load ramp and increasing the stiffness of the head lifting tab;
    wherein the first portion of the first head lifting tab is curved about a longitudinal axis of the first head lifting tab and the second potion of the first head lifting tab is curved about a line that is perpendicular to the longitudinal axis of the first head lifting tab and about the longitudinal axis of the first head lifting tab.

4. An actuator for mounting in a disk drive and for communicating with a disk cartridge, comprising:
   a first actuator arm for rotatably mounting the actuator to the disk drive;
   a first suspension arm mounted to the first actuator arm and extending from the first actuator arm, the first suspension arm having a longitudinal axis;
   a first head lifting tab, having a longitudinal axis that is perpendicular to the longitudinal axis of the first suspension arm, for lifting the actuator from the disk cartridge by slidably engaging a load ramp disposed in the disk drive, comprising
      (i) a first portion, disposed proximal to the first suspension arm, for increasing the stiffness of the head lifting tab; and
      (ii) a curved second portion, extending from the first position and defining a camming surface, for sidably engaging the load ramp and increasing the stiffness of the head lifting tab.

5. An actuator for mounting in a disk drive and for communicating with a disk cartridge, comprising:
   a first actuator arm for rotatably mounting the actuator to the disk drive;
   a first suspension arm mounted to the first actuator arm and extending from the first actuator arm, the first suspension arm having a longitudinal axis;
   a first head lifting tab, disposed in an angular relationship with the longitudinal axis of the first suspension arm, for lifting the actuator from the disk cartridge by slidably engaging a load ramp disposed in the disk drive, comprising
      (i) a first portion, disposed proximal to the first suspension arm, for increasing the stiffness of the head lifting tab; and
      (ii) a curved second portion, extending from the first position and defining a camming surface, for slidably engaging the load ramp and increasing the stiffness of the head lifting tab;
   wherein the first portion of the first head lifting tab is curved about a longitudinal axis of the first head lifting tab and the second potion of the first head lifting tab is curved about a line that is perpendicular to the longitudinal axis of the first head lifting tab.

6. An actuator for mounting in a disk drive and for communicating with a disk cartridge, comprising:
   a first actuator arm for rotatably mounting the actuator to the disk drive;
   a first suspension arm mounted to the first actuator arm and extending from the first actuator arm, the first suspension arm having a longitudinal axis;
   a first head lifting tab, disposed in an angular relationship with the longitudinal axis of the first suspension arm, for lifting the actuator from the disk cartridge by slidably engaging a load ramp disposed in the disk drive, comprising
      (i) a first portion, disposed proximal to the first suspension arm, for increasing the stiffness of the head lifting tab; and
      (ii) a second portion, curved about a line that is perpendicular to a longitudinal axis of the first head lifting tab, extending from the first position and defining a camming surface, for slidably engaging the load ramp and increasing the stiffness of the head lifting tab.

7. The actuator of claim 6, further comprising a second actuator arm and a second suspension arm extending from the second actuator arm.

8. The actuator of claim 7, further comprising a second head lifting tab, disposed in an angular relationship with a longitudinal axis of the second suspension arm, for lifting the actuator from the disk cartridge by slidably engaging the load ramp.

9. The actuator of claim 8, wherein the second head lifting tab comprises a first portion, disposed proximal to the second suspension arm, for increasing the stiffness of the second head lifting tab and a curved second portion, extending from the first portion of the second head lifting tab and defining an end of the second head lifting tab, for slidably engaging the load ramp and for increasing the stiffness of the second head lifting tab.

10. A disk drive of the type that can receive a disk cartridge, comprising:
    a load ramp mounted to the disk drive;
    an actuator, rotatably mounted to the disk drive, comprising an actuator arm, a suspension arm having a longitudinal axis and extending form the actuator arm and a first head lifting tab having a longitudinal axis that is perpendicular to the longitudinal axis of the first suspension arm and being for lifting the suspension arm from the disk cartridge by slidably engaging the load ramp, the first head lifting tab comprising
       (i) a first portion, disposed proximal to the suspension arm, for increasing the stiffness of the first head lifting tab; and
       (ii) a curved second portion, extending from the first position and defining a camming surface, for slidably engaging the load ramp and increasing the stiffness of the head lifting tab.

11. A disk drive of the type that can receive a disk cartridge, comprising:
    a load ramp mounted to the disk drive;
    an actuator, rotatably mounted to the disk drive, comprising an actuator arm, a suspension arm extending form the actuator arm and a first head lifting tab, the first head lifting tab being disposed in an angular relationship with a longitudinal axis of the suspension arm and being for lifting the suspension arm from the disk cartridge by slidably engaging the load ramp, the first head lifting tab comprising
       (i) a first portion, disposed proximal to the suspension arm, for increasing the stiffness of the first head lifting tab; and
       (ii) a curved second portion, extending from the first position and defining a camming surface, for slidably engaging the load ramp and increasing the stiffness of the head lifting tab;
    wherein the first portion of the first head lifting tab is curved about a longitudinal axis of the first head lifting tab and the curved second portion of the first head lifting tab is curved about a line that is perpendicular to the longitudinal axis of the first head lifting tab.

12. A disk drive of the type that can receive a disk cartridge, comprising:
   a load ramp mounted to the disk drive;
   an actuator, rotatably mounted to the disk drive, comprising an actuator arm, a suspension arm extending form the actuator arm and a first head lifting tab, the first head lifting tab being disposed in an angular relationship with a longitudinal axis of the suspension arm and being for lifting the suspension arm from the disk cartridge by slidably engaging the load ramp, the first head lifting tab comprising
   (i) a first portion, disposed proximal to the suspension arm, for increasing the stiffness of the first head lifting tab; and
   (ii) a second portion, curved about a line that is perpendicular to a longitudinal axis of the first head lifting tab, extending from the first position and defining a camming surface, for slidably engaging the load ramp and increasing the stiffness of the head lifting tab.

13. The disk drive of claim 12, further comprising a second actuator arm and a second suspension arm extending from the second actuator arm.

14. The disk drive of claim 13, further comprising a second head lifting tab, disposed in an angular relationship with a longitudinal axis of the second suspension arm, for lifting the actuator from the disk cartridge by slidably engaging the load ramp.

15. The disk drive of claim 14, wherein the second head lifting tab comprises a first portion, disposed proximal to the second suspension arm, for increasing the stiffness of the second head lifting tab and a curved second portion, extending from the first portion of the second head lifting tab and defining an end of the second head lifting tab, for slidably engaging the load ramp and for increasing the stiffness of the second head lifting tab.

\* \* \* \* \*